United States Patent [19]
d'Agostino et al.

[11] Patent Number: 4,502,501

[45] Date of Patent: Mar. 5, 1985

[54] FUEL CONTROL ASSEMBLY INCORPORATING AN INTEGRAL PRESSURE DROP MONITOR FOR USE WITH A GAS TURBINE PLANT

[75] Inventors: Guy d'Agostino, Vitry; André Dhainaut, Dammarie les Lys; Claude M. J. Maillard, Vulaines sur Seine, all of France

[73] Assignee: S.N.E.C.M.A., Paris, France

[21] Appl. No.: 504,163

[22] Filed: Jun. 14, 1983

[51] Int. Cl.³ .................... F16K 31/363; G05D 7/00
[52] U.S. Cl. .................................... 137/487; 137/495
[58] Field of Search ................ 137/487, 486, 495

[56] References Cited

U.S. PATENT DOCUMENTS

| | | | |
|---|---|---|---|
| 2,694,406 | 11/1954 | Ayers . | |
| 2,763,279 | 9/1956 | Godden | 137/487 X |
| 2,988,883 | 6/1961 | Corbett | 137/487 X |
| 3,508,575 | 4/1970 | Robinson . | |

FOREIGN PATENT DOCUMENTS

| | | |
|---|---|---|
| 1595739 | 7/1970 | France . |
| 2180485 | 11/1973 | France . |
| 2180484 | 11/1973 | France . |
| 2288866 | 5/1976 | France . |
| 920662 | 3/1963 | United Kingdom . |

*Primary Examiner*—Alan Cohan
*Attorney, Agent, or Firm*—Oblon, Fisher, Spivak, McClelland & Maier

[57] ABSTRACT

A fuel flow control assembly comprises a metering piston which can slide within a casing and defines with that casing an upstream chamber at a pressures $P_1$ and downstream pressure $P_2$. Relative movement of the piston and the casing varies the effective opening of a metering orifice and providing that the pressure drop $P_1 - P_2$ is kept constant the orifice has linear characteristics.

The assembly also includes a pressure drop monitor and a slide control valve which uses as its casing an internal bore of the flow control piston. With a view to rendering the assembly more compact the pressure drop monitor is also disposed within the bore of the flow control piston.

5 Claims, 2 Drawing Figures

FUEL CONTROL ASSEMBLY INCORPORATING AN INTEGRAL PRESSURE DROP MONITOR FOR USE WITH A GAS TURBINE PLANT

BACKGROUND OF THE INVENTION

1. Field of the Invention

This invention relates to a control assembly for a flow dispenser, a control valve and integral monitor of pressure drop in the flow.

2. Summary of the Prior Art

It is known, particularly from French Pat. Nos. 2 180 484 and 2 180 485, to provide a control assembly comprising a flow dispenser with linear displacement including a piston capable of sliding within a casing having an upstream chamber operable at a pressure $P_1$ and connected at the supply side with a pump and a downstream chamber operable at a pressure $P_2$ and connected directly or indirectly to a user installation such as a gas turbine, the piston comprising a metering section enabling the two chambers to communicate through a passage having a section controlled by the sliding of the piston, a control valve with linear displacement formed by a slide capable of sliding within a casing having an upstream chamber and a downstream chamber and adapted to provide communication between the two chambers in response to sliding motion of the slide brought about by a change in the pressure drop $P_1 - P_2$ detected by a pressure drop detector, the downstream chamber of the control valve being connected to the selected one of the two chambers of the flow dispenser and the upstream chamber being connected to a selected point of the circuit as a function of the type of pump used, so as to maintain the pressure drop $P_1 - P_2$ constant.

In the two patents referred to which relate to a main control, a volumetric pump is used which delivers a constant volume, and the purpose of the control valve is, in response to the detection of an increase in the pressure drop, to divert the excess of fuel between the pump and the dispenser in order to maintain constant the pressure drop within the dispenser. It is known that this is a condition required for the flow of fuel supplied to the injectors of a post-combustion or other fuel system of a gas turbine, which is proportional to the section of the passage and to the square-root of the pressure drop, and varies linearly with the displacements of the dispenser piston (if the section of the passage is proportional to the displacement of the piston). It is also known within the sphere of post-combustion controls of assemblies of the type referred to use a centrifugal pump which delivers at a pressure substantially independent of the flow. In this prior proposal, the maintenance of pressure drop at a constant value within the dispenser is achieved whilst connecting the control valve in series with the dispenser, so as to produce a supplementary throttling which enables action on the upstream or downstream pressure of the dispenser and thereby to re-establish, in response to a change, the pressure drop at the value determined for this flow.

Furthermore, it has already been proposed, particularly in French Pat. No. 2 288 866, to construct a control assembly comprising a dispenser and a control valve integrated therewith.

An object of the present invention is to continue progress in the miniaturization of fuel control systems.

SUMMARY OF THE INVENTION

Acccording to the present invention there is provided in a fuel flow control assembly, means defining a casing, a flow-control piston with an internal bore, slidable within the casing, and defining with the latter, an upstream chamber operable at a pressure $P_1$ and adapted to be connected to a pressurized fuel supply, a downstream chamber operable at a pressure $P_2$ and adapted to be connected to a fuel consumer installation, and a variable orifice providing communication between the said chambers in dependence upon the relative location of the piston and the casing, a linearly-displaceable slide control valve slidable within the bore of the piston, a pressure-drop monitor disposed within the bore of the piston and capable of detecting a change in the pressure drop $P_1 - P_2$, the slide control valve serving to vary the communication between the said upstream and downstream chambers in dependence upon any change in the pressure drop detected by the monitor and defining with the flow control piston both an upstream chamber and a downstream chamber, means for providing communication between the upstream chamber of the slide control valve and one of the chambers of the flow-control piston and its casing, and means for providing communication between a downstream chamber of the slide control valve being connected to a point in the fuel flow control circuit determined as a function of the type of pump utilized in said pressurized fuel supply.

The assembly as set forth in the immediately above paragraph thus provides for the arrangement within the same enclosure, of the main elements of a flow control means, namely: the dispensing piston, the control valve and the pressure drop monitor, the two latter elements being located end-to-end within the dispensing piston.

Passages may be provided in order to place in communication, in response to the detection of an increase or a decrease in the pressure drop $P_1 - P_2$, either the downstream chamber at the pressure $P_2$ or the upstream chamber at the pressure $P_1$, with one of the front or end chambers, termed modulating chambers, of the control slide valve, which chamber comprises an adjusting spring, the other front or end chamber being maintained constantly at the pressure $P_1$.

In a preferred embodiment, the pressure drop monitor comprises a housing located in the bore of the dispenser piston, in the interior of which a slide member is slidable in response to the pressure existing generally and exerted between the two enclosures, the one connected permanently to the upstream chamber at the pressure $P_1$, the other connected permanently to the downstream chamber at the pressure $P_2$ and comprising an adjusting spring, the displacement of the slide member of the monitor causing the change-over of the communication between the modulating chamber of the control valve and the one of the two upstream and downstream chambers of the flow-control piston.

One end of the monitor slide member is arranged to slide within a sleeve in which are provided recesses which cooperate with an annular groove of the slide member in order to effect the said change-over in the communication.

DESCRIPTION OF THE PREFERRED EMBODIMENT

Figure 1:
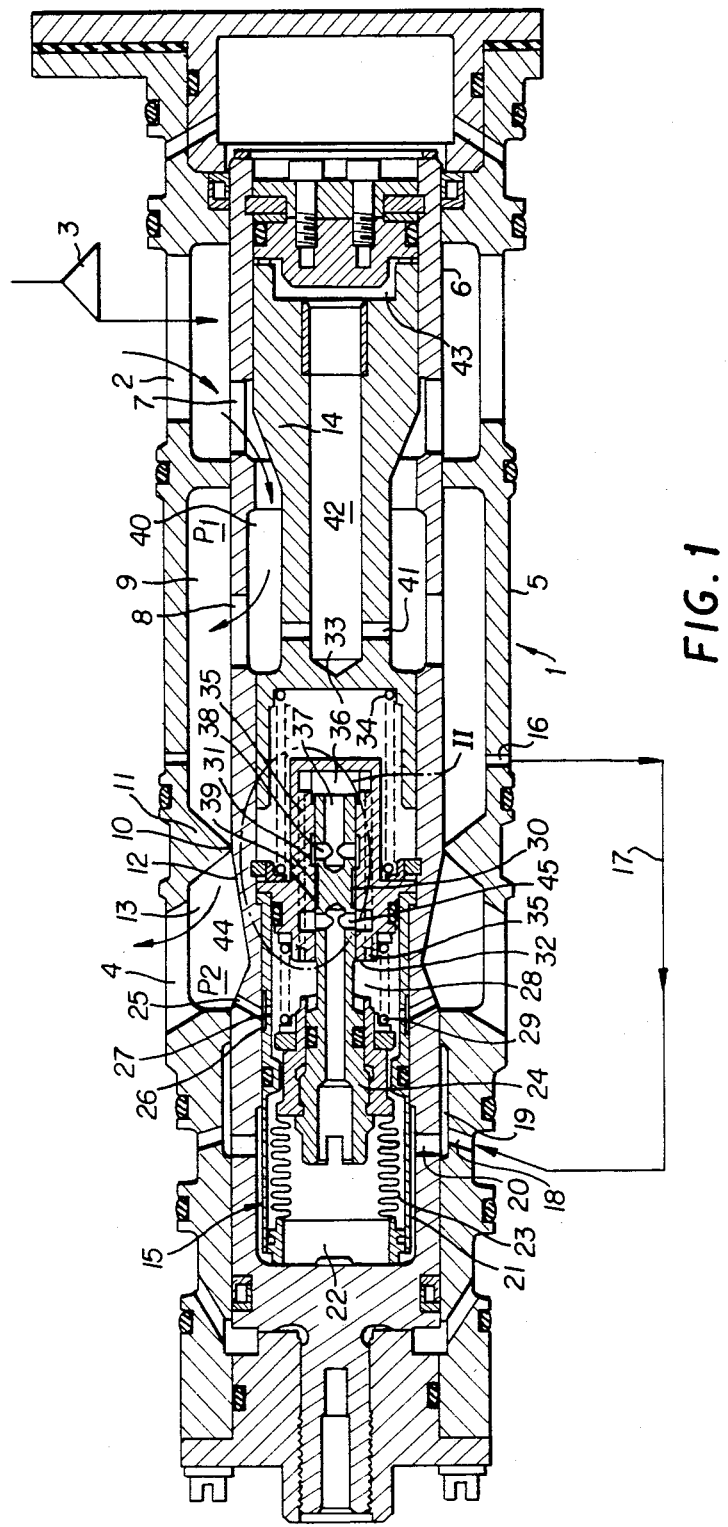
FIG. 1 is a longitudinal section of a control assembly embodying the invention, intended for a gas turbine post-combustion control system.

An assembly generally referenced 1 is interposed between an inlet 2 for fuel supplied by a centrifugal pump 3 and an outlet 4 for the fuel leading to a conventional user installation (not shown) such as the post-combustion or after-burner system of an aircraft gas turbine.

The assembly 1 broadly comprises, within an external housing (not shown), a cylindrical dispenser or metering casing 5 within which a dispenser or metering piston 6 is slidable. The casing fits within the housing and makes sealed contact therewith at a plurality of annular seals spaced along the periphery of the casing.

The delivery of the centrifugal pump 3 is admitted to the piston 6 through the inlet 2 of the casing 5 and then passes through passages 7 and 8 of the piston 6 in order to fill an annular upstream chamber 9 at pressure $P_1$, and then passes through an annular calibration or metering orifice 10 defined between an annular shoulder 11 of the casing 5 and a frusto-conical seating 12 formed on the periphery of the piston 6, this seating lying within an annular downstream chamber 13 in which the pressure has a value $P_2$ and finally through the outlet 4 before being supplied to the injectors (not shown) of the user installation.

In order that the metered flow should vary linearly with the section of the orifice 10, the pressure difference $P_1 - P_2$ between the upstream and the downstream sides of the orifice 10 must be maintained constant by a slide member forming a control valve 14 sliding within the piston 6, which piston serves as the valve casing and in order that the control valve should throttle the flow of fuel through the passage 7 to a greater or lesser extent, the location thereof is matched to a modulated pressure developed within a pressure-drop monitor indicated generally by reference numeral 15.

The pressure $P_1$ upstream of the piston 6, that is to say the pressure existing in the upstream chamber 9, is transmitted through a passage 16, an external connection 17, a passage 18, an annular chamber 19 on the inside of the casing 5, a passage 20 of the piston 6, a chamber 21 surrounding the housing of the pressure-drop monitor 15, to an enclosure 22 downstream of the pressure-drop monitor 15, to an enclosure 22 downstream of the pressure-drop monitor 15, defined by bellows 23 and the bore of a slide member 24 of the monitor 15. Entry from the annular chamber 21 to the enclosure takes place through arcuate notches formed in the left-hand end of the wall of the cylindrical member which defines the enclosure 22. The elements 16 to 21 can be duplicated as shown in the upper half of FIG. 1. The pressure $P_2$ at the downstream end of the piston 6, that is to say the pressure existing within the downstream chamber 13, is transmitted through a passage 25 in the piston 6, an annular groove 26 and a passage 27 of the pressure-drop monitor 15, to a rear enclosure 28 of the latter.

An adjustment spring 29 is accommodated with the rear enclosure 28 and abuts the slide member 24 in order to provide for a pre-determined pressure drop $\Delta P$.

If the pressure $P_1$, upstream of the piston 6, and within the downstream enclosure 22 of the pressure-drop monitor 15 increases the bellows 23 expand and the slide member 24 is moved to the right as shown in the Figures.

This translatory movement of the slide member 24 places in communication annular grooves 30 of the slide members 24 and 31 of a sleeve 32 of the pressure drop monitor within which the slide member 24 can slide.

Figure 2:
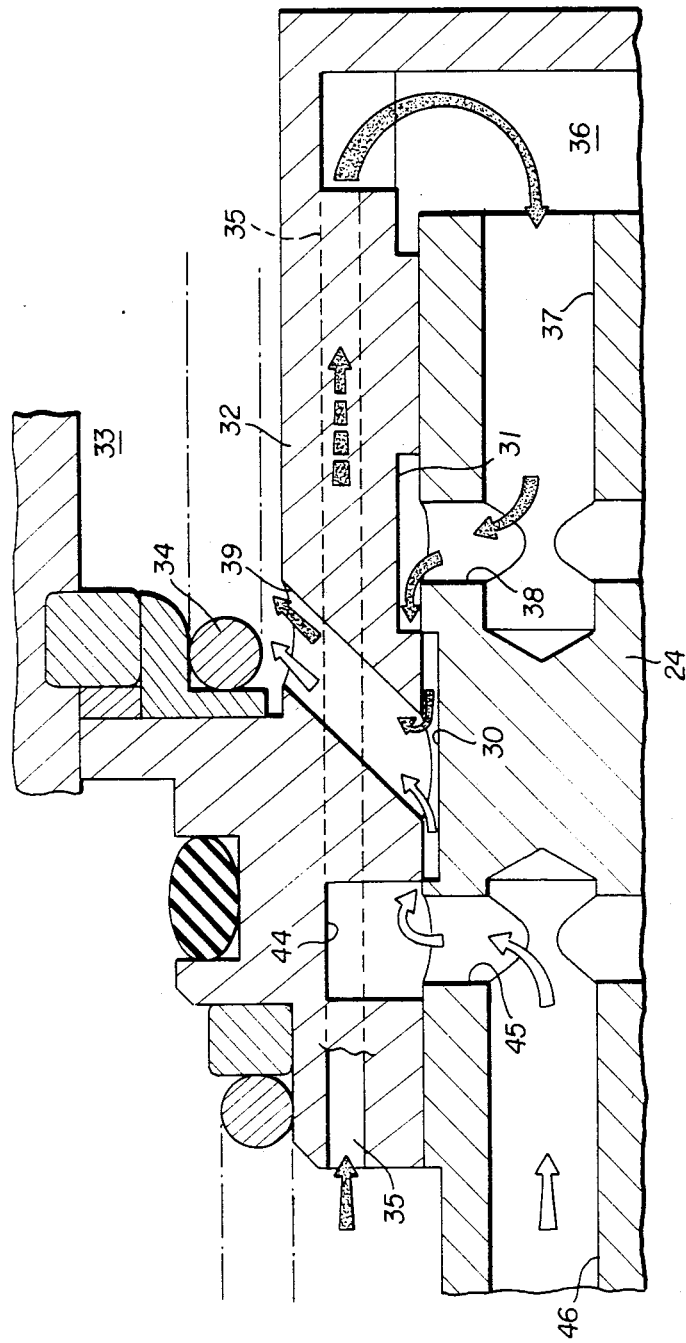
FIG. 2 shows the detail referenced II in FIG. 1, to an enlarged scale, including elements of a slide member of a pressure drop monitor enabling the change-over in the pressure in a modulating chamber of a control valve of the assembly.

The pressure $P_2$ downstream of the piston 6, and within the rear enclosure 28 of the monitor 15 is then transmitted to a modulating chamber 33 of the slide member of the control valve incorporating and adjusting spring 34, through the intermediary of longitudinal channels 35 provided in the sleeve 32, a base chamber 36, an end bore 37 of the slide member 24, radial passages 38 of the slide member 24, the annular grooves 31 and 30 which are in communication with one another, then passages 39 connecting the annular groove 30 to the modulating chamber 33. The transmission of pressure is indicated by black arrows in FIG. 2. The pressure in the modulating chamber 33 of the slide member of the control valve is thus the pressure $P_2$ downstream of the piston 6 which is less than the upstream pressure $P_1$ existing within the chamber 9 of the piston, as well as in the recess 40 of the slide member of the valve and through its orifices 41 a bore 42 communicating with a chamber 43. It follows that the slide member of the valve 14 moves to the left and throttles down the fuel flow passage 7. The drop in upstream pressure $P_1$ thus created returns the pressure drop $\Delta P$ within the piston 6 to its control value.

If conversely, the upstream pressure $P_1$ falls, the contraction of the bellows 23 causes the slide member 24 of the monitor 15 to move to the left, which results in bringing into communication the annular groove 30 of the slide member 24 connecting a main bore 46 of the slide member 24. Because of this, the pressure $P_1$ existing within the downstream enclosure 22 is transmitted (see white arrows in FIG. 2) through radial passages 45, annular passages 44, 30, and inclined passages 39 to the modulating chamber 33; the slide of the valve 14 is then moved back to the right and uncovers passage 17 so as to re-establish the pressure drop $\Delta P$ to its control valve.

The upstream chamber of the slide control valve is connected to predetermined points in the fuel supply circuit on the following basis:

(i) if the pump is of the volumetric type, the valve must cause a zone upstream of the flow-control or dispenser piston (that is to say the delivery of the pump) and the intake of the latter to be placed in communication with one another;

(ii) if the pump is of the centrifugal type (as in the illustrated embodiment) the slide control valve is connected in series between the delivery of the pump and the flow-control or dispensing piston.

The embodiment which has just been described is intended for use with a post-combustion control system of an aircraft gas turbine. It will be understood that control systems embodying the invention can also be used with the main fuel control system of a gas turbine.

We claim:

1. In a fuel flow control assembly,
   means defining a casing, a flow-control piston with an internal bore, slidable within the casing, and defining with the latter,
   an upstream chamber operable at a pressure $P_1$ and adapted to be connected to a pressurized fuel supply including a pump, a downstream chamber operable at a pressure $P_2$ and adapted to be connected to a pressurized fuel consumer installation, and a variable metering orifice providing communication between the said chambers in dependence upon the relative location of the piston and the casing, a linearly-displaceable slide control valve slidable within the bore of the piston, a pressure-drop monitor disposed within the bore of the piston and capable of detecting a change in the pressure drop $P_1 - P_2$ across the variable metering orifice.

the slide control valve serving to provide communication between the said upstream and downstream chambers of the flow-control piston in dependence upon any change in the pressure drop detected by the monitor and furthermore defining with the flow control piston both an upstream chamber and a downstream chamber, means for providing communication between the downstream chamber of the slide control valve and a selected one of the chambers of the flow-control piston and its casing, and means for providing communication between the upstream chamber of the slide control valve and a point in the fuel flow control circuit determined as a function of the type of pump utilized in providing said pressurized fuel supply.

2. An assembly according to claim 1, wherein the pressure drop monitor and the slide control valve are located at the opposed longitudinal ends of the bore of the flow-control piston.

3. An assembly according to claim 1 wherein the slide control valve defines two end chambers, one end chamber being adapted to be maintained at the pressure $P_1$ of the upstream chamber of the flow-control piston and the other, modulating, end chamber having therein an adjusting spring abutting the pressure drop monitor, and passage means for providing communication, in response to detection by the monitor of a change in the pressure drop $P_1 - P_2$, selectively between the downstream or the upstream chamber of the flow-control piston and the modulating chamber.

4. An assembly according to claim 3 wherein the pressure-drop monitor comprises a housing located within the bore of the flow-control piston, a slide member slidable within the housing, means defining within the housing an enclosure connected permanently to the upstream chamber of the flow-control piston at pressure $P_1$, and means within the housing defining a second enclosure permanently connected with the downstream chamber of the flow-control piston at pressure $P_2$, an adjustment spring in the second enclosure, the displacement of the slide member of the pressure drop monitor serving to change over the communication between the modulating chamber of the slide member of the slide control valve and the upstream and downstream chambers of the flow-control piston.

5. An assembly according to claim 4, wherein the pressure-drop monitor further comprises a sleeve having recesses therein, the slide member of the monitor having an annular groove which cooperates with the recesses of the sleeve to enable said changeover in communication.

* * * * *